(12) United States Patent
Hallam et al.

(10) Patent No.: US 6,247,950 B1
(45) Date of Patent: *Jun. 19, 2001

(54) SECURE SMART CARD AND TOOL FOR REMOVING SAME

(75) Inventors: Toby Hallam, Berkshire (GB); Philip I. Siegel, Fountain Valley, CA (US)

(73) Assignees: NDS Limited (GB); Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,698

(22) Filed: Mar. 18, 1999

(30) Foreign Application Priority Data

Mar. 20, 1998 (GB) .................................... 9806076

(51) Int. Cl.⁷ ..................................... G06K 19/06
(52) U.S. Cl. .................. 439/267; 235/492; 235/441; 235/267; 294/1.1; 294/15
(58) Field of Search ..................... 235/441, 492, 235/482; 294/1.1, 15, 26; 439/267

(56) References Cited

U.S. PATENT DOCUMENTS 3,867,753 * 2/1975 Urban, II et al. ................. 294/15
5,828,043 * 10/1998 Nicoll et al. ..................... 235/380
5,929,413 * 7/1999 Gardner ........................... 235/379
6,015,311 * 1/2000 Benjamin et al. ................. 439/267

FOREIGN PATENT DOCUMENTS 7-74488     3/1995  (JP) .
WO 96/30866 10/1996 (WO) .

* cited by examiner

Primary Examiner—Harold I. Pitts
(74) Attorney, Agent, or Firm—John A. Crook; Michael W. Sales

(57) ABSTRACT

According to the present invention there is provided apparatus for removing a card from an opening in an electrical device. The apparatus comprises: a card including a semiconductor chip capable of making electrical connection with a contact in the opening and wherein the cards fits into the opening with substantially no part protruding therefrom and a tool that is adapted to effect removal of the card from the opening. This has the advantage that the card makes the appropriate internal contacts and can only be removed by authorized users. This stops theft of the card from retail outlets. In addition, the invention also prevents children and animals removing the card and damaging it in the home environment.

20 Claims, 2 Drawing Sheets

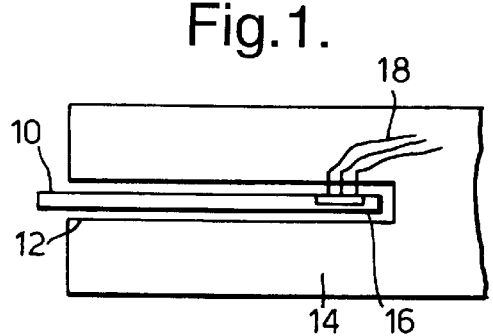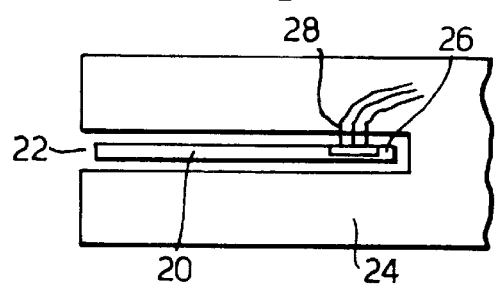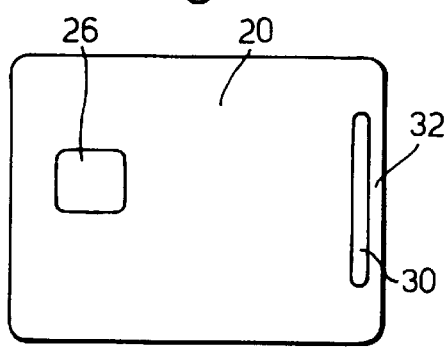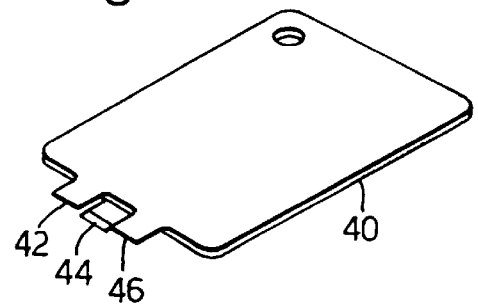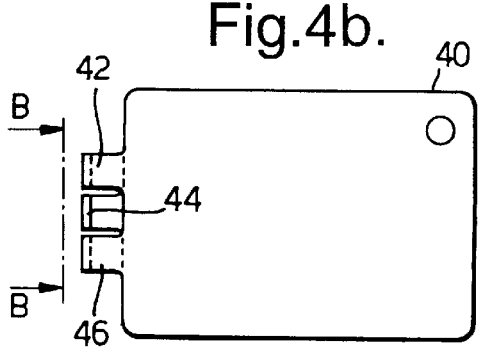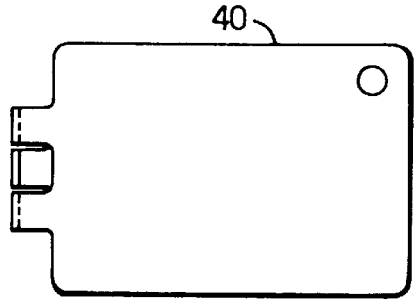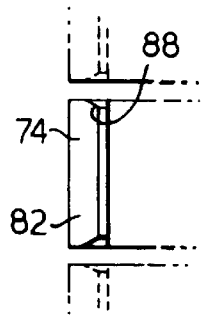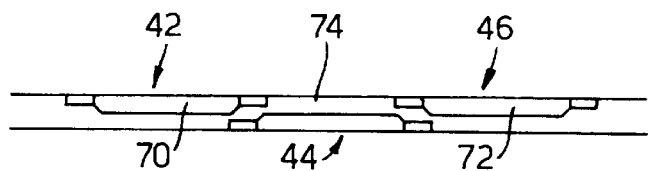

Fig. 8a.
Fig. 9a.
Fig. 8b.
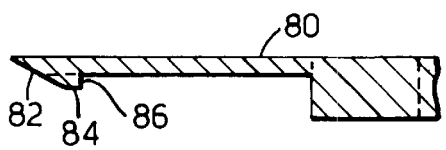
Fig. 9b.
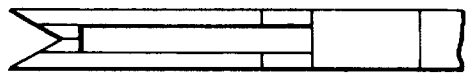
Fig. 10.
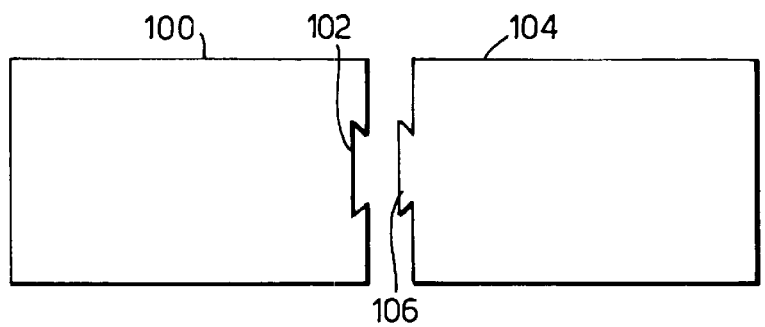
Fig. 11.
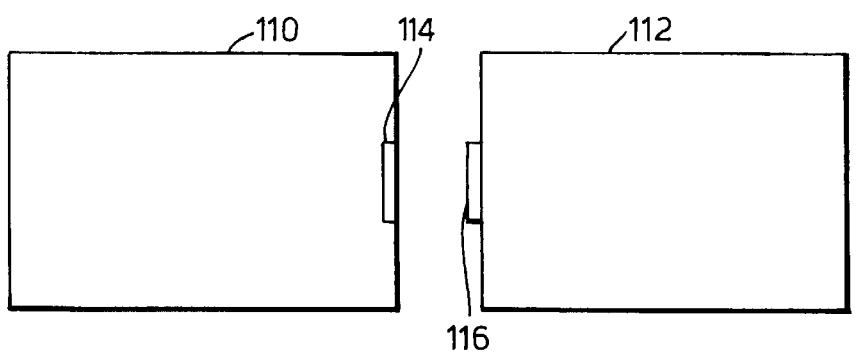
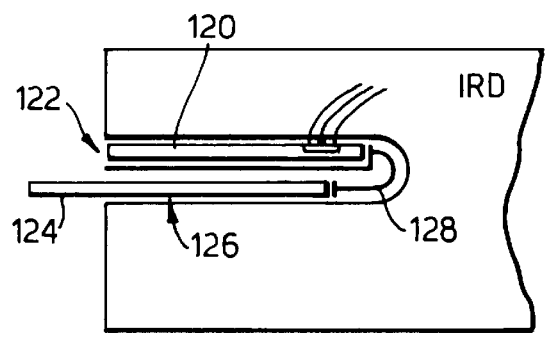
Fig. 12.

SECURE SMART CARD AND TOOL FOR REMOVING SAME

BACKGROUND OF THE INVENTION

1. Field of the Invention

This invention relates to improvements in the insertion and removal of so-called smart cards from other equipment.

2. Description of the Related Art

A smart card is a well-known security device that is used to permit or deny access to certain equipment, services or the like. The card is generally inserted into another piece of equipment. One example of a way in which a smart card is used is in an integrated receiver device (IRD) for receiving broadcast material. In this example, the card includes control information that enables descrambling of a television signal for viewing by a user. Without an appropriate card it may not be possible to receive any broadcast material, or it may only be possible to view the free channels. For viewing other services it may be necessary to pay a fee, this, once received, enables new control signals from the card for those other services.

Certain users will have cards that provide access to all services available within a given network. Such a card would thus be of value to anyone who wanted to gain access to the supplied services.

Any user who has a card may want to prevent others removing or stealing the card. For example, in a shop the cards used in products on display are generally capable of receiving all services. These would be of value to any users with less access. This will also be of use in public houses, clubs and other public entertainment establishments.

In addition, in the home environment removal of cards by children and babies can result in damage to the card which can stop it from working.

In the present card systems, such as are described above the edge of the card protrudes from the opening into which it is inserted. This allows ease of insertion and removal of the card. The card includes a semiconductor chip that makes contact with an internal section of the IRD.

A need exists for a new type of card that cannot be removed other than by an authorized user but that still makes the appropriate internal contacts.

SUMMARY OF THE INVENTION

According to one aspect of the present invention there is provided apparatus for removing a card from an opening in an electrical device comprising: a card including a semiconductor chip capable of making electrical connection with a contact in the opening and wherein the cards fits into the opening with substantially no part protruding therefrom; and a tool that is adapted to effect removal of the card from the opening.

This has the advantage that the card makes the appropriate internal contacts and can only be removed by authorized users.

According to a second aspect of the present invention there is provided a tool that is adapted to remove a card from an opening in an electrical device, wherein the card fits in the opening with substantially no part protruding therefrom.

According to a third aspect of the present invention there is provided a card capable of being inserted into an opening in an electrical device wherein the card fits into the opening with substantially no part protruding therefrom, that is capable of being removed from the opening by a tool adapted for that purpose.

BRIEF DESCRIPTION OF THE DRAWINGS

Reference will now be made, by way of example to the accompanying drawings, in which:

FIG. 1, shows a prior art card and opening;

FIG. 2, is a diagram of a card and opening according to the present invention;

FIG. 3, is a diagram of the card of FIG. 2;

FIG. 4a, is a three-dimensional diagram of a tool for removing the card of FIG. 3;

FIG. 4b, is a plan view of the tool in FIG. 4a;

FIG. 4c, is a plan view of the tool in FIG. 4a showing the relative dimensions;

FIG. 5, is an enlarged diagram of section A of FIG. 4b;

FIG. 6, is a cross-sectional view of FIG. 4;

FIG. 7, is an enlarged version of FIG. 6;

FIGS. 8a and 8b, are diagrams showing details of part of the tool;

FIGS. 9a and 9b, are diagrams showing details of part of the tool;

FIG. 10, is a diagram of a second embodiment of tool and card;

FIG. 11, is a diagram of a third embodiment of tool and card; and,

FIG. 12, is a diagram of a fourth embodiment of tool and card.

DETAILED DESCRIPTION OF PREFERRED EMBODIMENTS

Referring now to FIG. 1, a typical prior art system is shown. A smart card or other access type card 10 is shown inserted into an opening 12 in, for example, an Integrated Receiver Device (IRD) 14.

The card includes a semiconductor chip 16 that makes contact with the IRD via contacts 18. The card extends beyond the entrance of the opening in order to facilitate easy insertion and removal of the card from the opening.

Referring now to FIG. 2, a new card and opening system is shown. A card 20 is shown inserted into the opening 22 of an IRD 24. The card has a chip 26 embedded therein that makes electrical contact with the IRD via contacts 28. The card, when inserted in the opening, is fully enclosed in the opening and there is no portion that extends beyond the entrance of the opening. The card can only be removed from the opening with a tool as described below.

Referring to FIG. 3, the card 20 is shown in greater detail. The card includes a slot 30, the function of which will be described in greater detail below. The length of the card is approximately 16 mm less than a conventional card. It will be appreciated, however, that the card may be any length, as long as no substantial part extends beyond the entrance of the opening. In this situation, a substantial part would be a piece of card that is of sufficient size to be grabbed. The card may also include a small hole that can be used for a chain or the like to carry the card.

Referring to FIGS., 4a, 4b and 4c, one embodiment of the tool for removing the card of FIGS. 2 or 3 from an opening is shown. The tool 40 is substantially the same shape as a conventional smart card and includes three longitudinally extending teeth 42, 44 and 46. Two of the teeth 42 and 46 are slightly offset towards the upper surface and offset respectively to the left and right of a longitudinal central axis 48. These two teeth have downwardly pointing extensions 70 and 72 in FIG. 7. The third of the teeth members 44 is slightly offset towards the lower surface of the tool and substantial central with respect to the longitudinal axis. The tooth 44 has an upwardly pointing extension 74 in FIG. 7 and FIG. 5.

The spacing and shape of the teeth is such that the tool can slide over the card at area 32 of the card and the upwardly and downwardly pointing extension 70, 72 and 74 engage with slot 30. Thus in use the tool 40 is inserted into the entrance of the opening 22 and engages the card 20. Subsequent removal of the tool also results in removal of the card.

Referring now to FIG. 5, FIGS. 8a and 8b and FIGS. 9a and 9b, the teeth are shown in greater detail. The tooth includes a longitudinal section 80 that is made of a resilient material. A main chamfer edge 82 forms the front end of the extension 70, 72 or 74. The remaining extension includes a flat horizontal surface 84 and a vertical edge 86. In addition to the main chamfer edge there is an extra chamfer edge 88 on each end of every tooth. This facilitates easy removal of the card from the tool.

As the tool is inserted in the opening the main chamfer edge 82 slides along the card, causing the tooth to bend slightly outwards. Continued movement of the tool will result in the horizontal surface 84 overlying the slot 30 in the card. Due to the resilience of the tooth when the surface 84 overlies the slot the tooth will reform to its original shape and position and the extension member 70, 72 or 74 will be located in the slot. Removal of the tool will cause the edge 86 to come into contact with the inner surface of the slot 30 in area 32 and thus allow removal of the tool.

Referring now to FIG. 10, a second embodiment of the invention is shown. In this case, the card 100 has a keying section 102. The tool 104 has an equal and opposite keying section 106. The keying sections 102 and 106 are shaped and sized such that one makes a snap fit with the other. This has the effect of temporarily joining the card to the tool, therefore making it possible to remove the tool.

In the third embodiment of the present invention, FIG. 11, the card 110 and/or the tool 112 have an adhesive member 114 and/or 116. The adhesive member or members may comprise a sticky pad, VELCRO™ or the like.

Referring now to FIG. 12, a card 120 is shown inserted into an opening 122 in an Integrated Receiver Device (IRD). Tool 124 is insertable into a second opening 126. Insertion of the tool causes pushing member 128 to move against the card and gradually push the card out of the opening. Reinsertion of the card causes the pushing member to return to the figure shown in FIG. 12.

CONCLUSION

A number of embodiments of the invention have been described herein, but it will be evident to the skilled person that numerous alternative embodiments may also be adopted. The key feature that will be common for all is that the tool may directly or indirectly produce movement of the card such that the card can be removed. Similarly with the main embodiment (See FIGS. 1–9), it is possible to have a clamping mechanism that has different numbers of teeth. In addition different shaped teeth and slots could be used.

Further, it is also possible that a mechanical tool could be used that has an actuator that grabs the card. This type of tool may be similar to the main embodiment but with mechanical activation of the teeth after the tool is in place to effect grabbing of the card. Similarly the keying section 10 in FIG. 10 may be electrically or mechanically activated once the tool is in place.

It will be understood that the tool may also be used to insert the card in all embodiments shown above.

What is claimed is:

1. An apparatus for removing a card from an opening in an electrical device comprising:
    a card including a semiconductor chip capable of making electrical connection with a contact in the opening and wherein the cards fits in to the opening with substantially no part protruding therefrom; and
    a card shaped slot engaging tool that is adapted to effect removal of the card from the opening.

2. The apparatus of claim 1, wherein the opening tool cooperates with the card to effect removal of the card from the opening.

3. The apparatus of claim 2, wherein the tool cooperates directly with the card.

4. The apparatus of claim 1, wherein the tool is inserted into the opening to effect removal of the card.

5. The apparatus of claim 1, wherein the tool includes at least one member capable of connecting the tool to the card, such that removal of the tool effects removal of the card from the opening.

6. The apparatus of claim 5, wherein the card includes a slot and one or more members include an extension that is engageable with the slot to thereby connect the tool to the card.

7. The apparatus of claim 5; wherein the card and the tool include cooperating keying members that are engageable with each other to connect the tool to the card.

8. The apparatus of claim 6, further comprising an actuator for mechanically effecting the connection between the tool and the card.

9. The apparatus of claim 7, further comprising an actuator for mechanically effecting the connection between the tool and the card.

10. A card capable of being inserted into an opening in an electrical device wherein the card fits into the opening with substantially no part protruding therefrom, that is capable of being removed from the opening by a card shaped slot engaging tool adapted for that purpose.

11. The card of claim 10, wherein the card includes a semiconductor chip capable of making electrical connection with a contact in the opening.

12. The card of claim 11, further comprising a slot engageable by a tool to effect removal of the card from the opening.

13. The card of claim 12, wherein the computer tool includes at least one member capable of connecting the tool to the card, such that removal of the tool effects removal of the card from the opening.

14. A card shaped slot engaging tool that is adapted to remove a card from an opening in an electrical device, wherein the card fits in the opening with substantially no part protruding therefrom.

15. The tool of claim 14, wherein the tool cooperates with the card to effect removal of the card from the opening.

16. The tool of claim 14, wherein the tool is inserted into the opening to effect removal of the card.

17. The tool of claim 14, further comprising at least one member capable of connecting the tool to the card, such that removal of the tool effects the removal of the card from the opening.

18. The tool of claim 14, wherein the card includes a slot and the members include an extension that is engageable with the slot to thereby connect the tool to the card.

19. A method of removing a card from an opening in an electrical device comprising providing a card that includes a semiconductor chip capable of making electrical connection with a contact in the opening and that fits into the opening with substantially no part protruding therefrom and using a card shaped slot engaging tool to effect the removal of the card from the opening.

20. The method of claim 19, wherein the card comprises a slot and the tool comprises at least one member capable of connecting the tool to the card, and step of using the tool to effect removal of the card from the opening comprises the steps of:

inserting the tool into the opening so as to engage the member with the slot; and removing the tool from the opening.

\* \* \* \* \*